(12) United States Patent
Robinson et al.

(10) Patent No.: US 8,831,024 B2
(45) Date of Patent: Sep. 9, 2014

(54) DYNAMIC HEADER CREATION AND FLOW CONTROL FOR A PROGRAMMABLE COMMUNICATIONS PROCESSOR, AND APPLICATIONS THEREOF

(75) Inventors: Michael R. Robinson, Atlanta, GA (US); Joel I. Danzig, Alpharetta, GA (US); Thomas L. Johnson, Alto, GA (US)

(73) Assignee: Broadcom Corporation, Irvine, CA (US)

( * ) Notice: Subject to any disclaimer, the term of this patent is extended or adjusted under 35 U.S.C. 154(b) by 543 days.

(21) Appl. No.: 11/966,843

(22) Filed: Dec. 28, 2007

(65) Prior Publication Data

US 2008/0159140 A1 Jul. 3, 2008

Related U.S. Application Data

(60) Provisional application No. 60/877,624, filed on Dec. 29, 2006.

(51) Int. Cl.
*H04L 12/28* (2006.01)
*H04L 12/56* (2006.01)

(52) U.S. Cl.
USPC .......................................... 370/412

(58) Field of Classification Search
CPC ....... H04L 49/90; H04L 47/10; H04L 49/608; H04L 1/0003; H04L 1/165
USPC ................................. 370/412–418
See application file for complete search history.

(56) References Cited

U.S. PATENT DOCUMENTS 5,724,358 A * 3/1998 Headrick et al. .............. 370/418
2001/0053148 A1* 12/2001 Bilic et al. .................... 370/389
2002/0080791 A1* 6/2002 Sylvain ......................... 370/394
2002/0091826 A1* 7/2002 Comeau et al. ............... 709/226
2003/0115355 A1* 6/2003 Cometto et al. .............. 709/234
2004/0165530 A1* 8/2004 Bedekar et al. .............. 370/235
2005/0021864 A1* 1/2005 Sherman et al. ............. 709/247
2005/0066166 A1* 3/2005 Chin et al. .................... 713/165
2007/0223483 A1* 9/2007 Huang et al. .................. 370/394
2009/0175278 A1* 7/2009 Harel et al. ................ 370/395.1
2010/0211626 A1* 8/2010 Li ................................... 709/203

* cited by examiner

*Primary Examiner* — Ronald Abelson
(74) *Attorney, Agent, or Firm* — Sterne, Kessler, Goldstein & Fox PLLC

(57) ABSTRACT

A method, system and computer program product for creating dynamic custom headers and for controlling flow rate of Downstream External Physical layer Interface (DEPI) packets are described herein. The method comprises concatenating or fragmenting a packet descriptor of a DEPU packet based on one or more of associated packet size, maximum transmission unit, packet type, channel configuration information and flow control mode. The method further comprises creating a header for the packet based on data in a programmable header template and storing the header in a header buffer, determining whether to transmit the packet based on one of a flow meter or a maximum transmission unit size and transmitting the packet by sending the packet descriptor to an output direct memory access (DMA) controller. A flow meter flow control mode determines if a packet is to be transmitted based on packet size, bucket size, a low threshold and a high threshold. A maximum transmission unit flow control mode determines if a packet is to transmitted based on packet size and a maximum transmission unit size. The header can be customized for Packet Streaming Protocol (PSP) mode or Moving Picture Experts Group Transport Stream (MPT) mode and includes dynamic customizable fields such as User Datagram Protocol (UDP) port identification, flow identification and session identification.

22 Claims, 7 Drawing Sheets

DYNAMIC HEADER CREATION AND FLOW CONTROL FOR A PROGRAMMABLE COMMUNICATIONS PROCESSOR, AND APPLICATIONS THEREOF

CROSS-REFERENCE TO RELATED APPLICATIONS

This application claims the benefit of U.S. Provisional Application No. 60/877,624 filed Dec. 29, 2006, which is incorporated herein by reference in its entirety.

This patent application is potentially related to U.S. patent application Ser. No. 11/898,886, filed on Sep. 17, 2007, which is incorporated herein by reference in its entirety.

BACKGROUND OF THE INVENTION

1. Field of the Invention

The present invention generally relates to communications processors.

2. Background Art

Data Over Cable Service Interface Specification (DOCSIS) is a standard for cable modem interfaces. DOCSIS defines the communications and operation support interface requirements for data over cable systems. It permits the addition of high-speed data transfer to an existing cable TV (CATV) system. It is employed by many cable television providers to provide Internet access over networks such as Hybrid Fiber Coaxial (HFC) networks.

The Modular Cable Modem Termination System (M-CMTS™) specification defines the requirements for head-end components in a DOCSIS system. The Downstream External Physical layer Interface (DEPI) specification describes protocol requirements for the transport of downstream user data between the M-CMTS Core and an Edge Quadrature Amplitude Modulator (EQAM). Conventional processors implementing the DEPI protocol are limited in configurability and do not support flow control or dynamic custom header creation for multiple channels having multiple priority levels. Methods and systems are needed for to overcome the above mentioned deficiencies.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
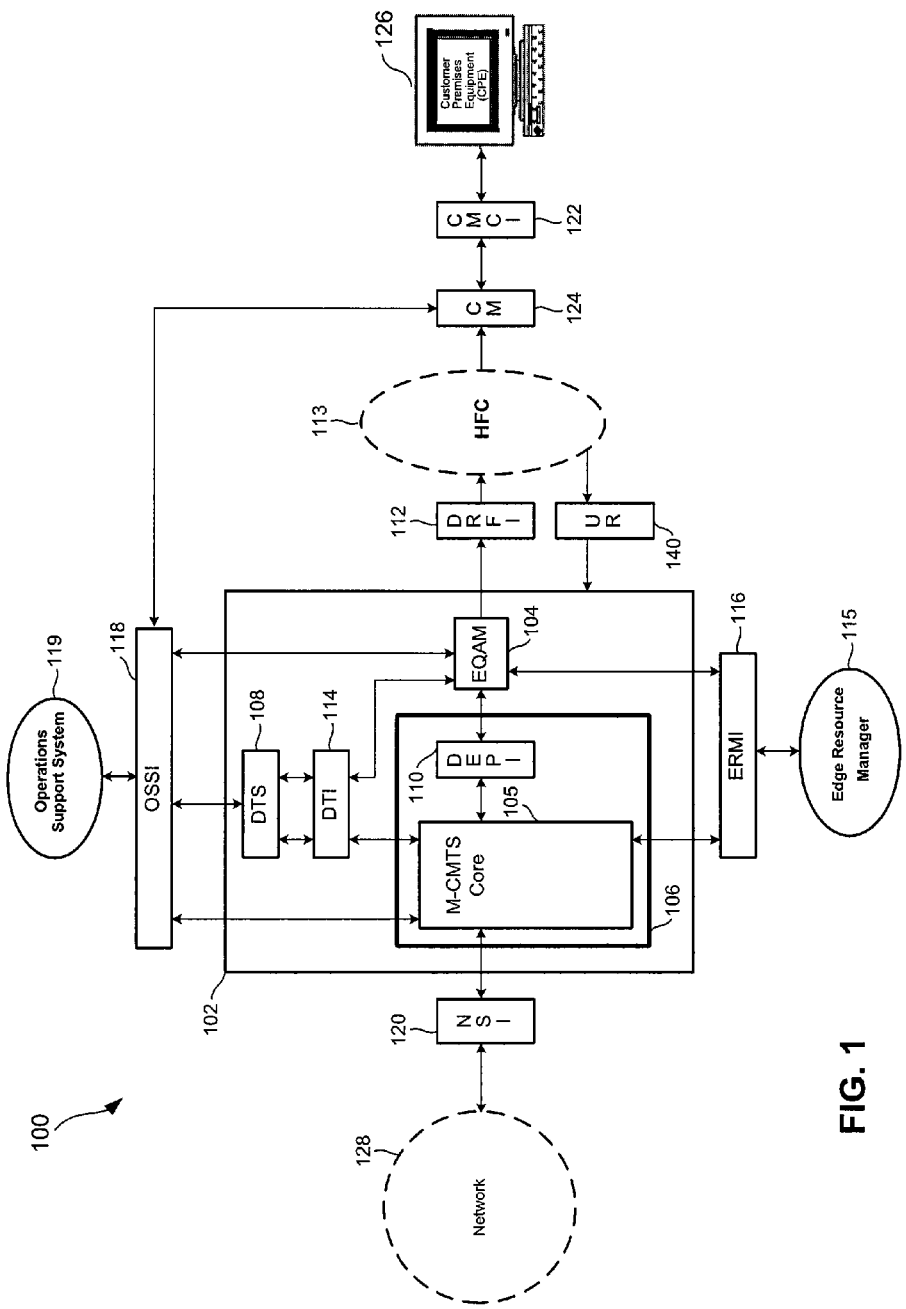
FIG. 1 illustrates an example communications system according to an embodiment of the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

1. Overview
2. Example DOCSIS system architecture
3. DEPI core architecture
   3a. Input Processor
   3b. Buffer Pool
   3c. Output Processors
4. DEPI Software
   4a. Configuring processors, channels, header templates and flows
   4b. Tables and templates
   4c. Processor commands
   4d. Example memory layout
   4e. Process loop
   4f. Ingress ring processing
   4g. Egress ring processing
   4h. Flow control modes
5. Example General Purpose Computer System
6. Conclusion

1. OVERVIEW

The present invention provides apparatus and methods for the transport of downstream user data between the M-CMTS Core and an Edge Quadrature Amplitude Modulator (EQAM) in a DOCSIS system. Embodiments of the invention provide configurable packet flow control, support for multiple channels with each channel having multiple levels of priority, customized formatting of packets on a per-channel basis, support for packet egress at EQAM line rates, firmware upgradeability, customized header creation, multiple processors with associated instruction and data memory and concatenation or fragmentation of packets. It is to be appreciated that even though embodiments are described with reference to a DOCSIS system, embodiments may be applied to any communication protocol where packets from multiple channels and multiple priorities per channel are to be processed with a high bandwidth protocol engine followed by formatting into packets by a programmable header generator or protocol encapsulation engine.

In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

2. EXAMPLE DOCSIS SYSTEM ARCHITECTURE

A DOCSIS communications system includes two primary components: a Cable Modem (CM) located at the customer premises, and a Modular Cable Modem Termination System (M-CMTS) located at the CATV headend.

A typical modular cable modem termination system hosts downstream and upstream ports. For duplex communication between a modular cable modem termination system and a cable modem two physical ports are used unlike Ethernet, where one port provides duplex communications. Because of the noise in the return (upstream) path, there are more upstream ports than downstream ports such that the additional upstream ports provide ways of compensating for noisy lines.

The customer personal computer and associated peripherals are termed Customer Premise Equipment (CPE). Customer premise equipment are connected to the cable modem, which is in turn connected through the HFC network to the cable modem termination system. The modular cable modem termination system routes traffic between the HFC and the Internet. Using the modular cable modem termination system, a cable operator can control the cable modem's configuration. Cable modem configuration may be changed to adjust for varying line conditions and customer service requirements.

FIG. 1 illustrates an example DOCSIS communications system 100 according to an embodiment of the invention. System 100 includes network 128, Network Side Interface (NSI) 120, Modular Cable Modem Termination System (M-CMTS) 102, Edge Resource Manager (ERM) 115, Edge Resource Management Interface (ERMI) 116, Operations Support Systems Interface (OSSI) 118, Operations Support System (OSS) 119, Downstream Radiofrequency Interface (DRFI) 112, upstream receiver (UR) 140, Hybrid Fiber-Coaxial (HFC) Network 113, Cable Modem (CM) 124, Cablemodem to Customer Interface (CMCI) 122 and Customer Premises Equipment (CPE) 126.

Network 128 may be a wide area network or local area network. In an embodiment, network 128 is an Ethernet network. Network side interface 120 is the physical interface for M-CMTS 102 to connect to network 128.

M-CMTS 102 includes DEPI core 106, Edge Quadrature Amplitude Modulator (EQAM) 104, DOCSIS Timing Server (DTS) 108 and DOCSIS Timing Interface Server (DTI) 114.

DEPI Core 106 includes Downstream External PHY Interface (DEPI) 110 and Modular Cable Modem Termination System (M-CMTS) core 105. M-CMTS core 105 performs DOCSIS Media Access Control (MAC) functions. These functions include signaling, downstream bandwidth scheduling and DOCSIS framing. DEPI 110 is typically an internet protocol tunnel that exists between a DOCSIS MAC layer in M-CMTS core 105 and a DOCSIS PHY layer that exists in the edge quadrature amplitude modulator 104. Downstream external PHY interface 110 contains both a data path for DOCSIS frames and a control path for setting up, maintaining and terminating data transfer sessions. Downstream external PHY interface 110 transports formatted DOCSIS frames or MPEG packets according to a layer 2 or layer 3 protocol and delivers them to edge quadrature amplitude modulator 104 for transmission. The base protocol used by downstream external PHY interface 110 to format packets is the Layer 2 Tunneling Protocol Version 3 (L2TPv3). L2TPv3 is a generic protocol for creating a "pseudowire" which is a mechanism to transparently transport a layer 2 protocol over a layer 3 network. Protocols supported by L2TPv3 include but are not limited to Asynchronous Transfer Mode (ATM), High-level Data Link Control (HDLC), Ethernet, Frame Relay and Point-to-Point Protocol (PPP).

DOCSIS timing server 108 is a timing signal generator. DOCSIS timing server 108 provides a common frequency (e.g. 10.24 MHz) and a DOCSIS timestamp to other M-CMTS 102 modules. DOCSIS timing server 108 distributes a DOCSIS timestamp and the common frequency over unshielded twisted pair (UTP). DOCSIS timing interface 114 automatically compensates for cable length and ensures that all M-CMTS 102 elements are synchronized by time and frequency.

DOCSIS timing interface 114 is a point-to-point interface from DOCSIS timing server 108 to other M-CMTS 102 modules. Each DEPI core 106 (if there are multiple cores 106) and edge quadrature amplitude modulator 104 has an associated DOCSIS timing interface 114 module.

Edge quadrature amplitude modulator 104 is a head end or hub device that receives packets of digital video or data. It re-packets the video or data into an MPEG transport stream and digitally modulates the digital transport stream onto a downstream Radio Frequency (RF) carrier using quadrature amplitude modulation (QAM). Edge quadrature amplitude modulator 104 contains Physical Layer (PHY) related circuitry, such as QAM modulators, and tunneling logic to connect to DEPI core 106.

Edge resource manager interface 116 comprises three interfaces (not shown): a registration interface between edge quadrature amplitude modulator 104 and edge resource manager 115, an EQAM control interface between edge quadrature amplitude modulator 104 and edge resource manager 115 and a M-CMTS control interface between M-CMTS core 106 and edge resource manager 115. The registration interface is used to register and un-register edge quadrature amplitude modulator 104 resources (i.e., QAM channels) with edge resource manager 115. The EQAM control interface is used by edge resource manager 115 to request QAM channel resources from edge quadrature amplitude modulator 104. The EQAM control interface is also used by edge quadrature amplitude modulator 104 to deliver resources to edge resource manager 115. The M-CMTS control interface is used by M-CMTS core 106 to request specific QAM channel resources from edge resource manager 115 and by edge resource manager 115 to respond to requests with the location of QAM channel resources.

Operations support systems interface 118 provides a management interface to each system 100 component. Operations support systems interface 118 monitors M-CMTS 102 functions and may be used in place of edge resource manager interface 116 to statically configure and associate QAM channel resources with M-CMTS cores 106. Operations support systems interface 118 allows for the modification of a QAM channel's physical layer parameter by either M-CMTS core 106 or edge quadrature amplitude modulator 104.

Operations support system 119 monitors underlying networks in system 100. Operations support system 119 monitors functional and non-functional requirements of system 100 and handles errors.

Downstream radio frequency interface 112 captures current and future radio frequency requirements in the downstream direction for integrated DOCSIS CMTS systems, M-CMTS systems 106 and Video On Demand (VOD) edge quadrature amplitude modulator systems.

Upstream receiver 140 serves as an interface for upstream communications from cable modem 124 to cable modem termination system 102.

Hybrid Fiber-Coaxial Network 113 incorporates both optical fiber along with coaxial cable to create a broadband network. An optical node converts optical signals to electrical and vice versa.

Cable modem 124 is a modulator-demodulator at subscriber locations for conveying data communications on a cable television system.

Cable-modem to customer interface 122 is typically 10/100 Mbps Ethernet or USB.

Customer premise equipment 126 is equipment at the end user's premises. Customer premise equipment 126 is typically a personal computer.

3. DEPI CORE ARCHITECTURE

Figure 2:
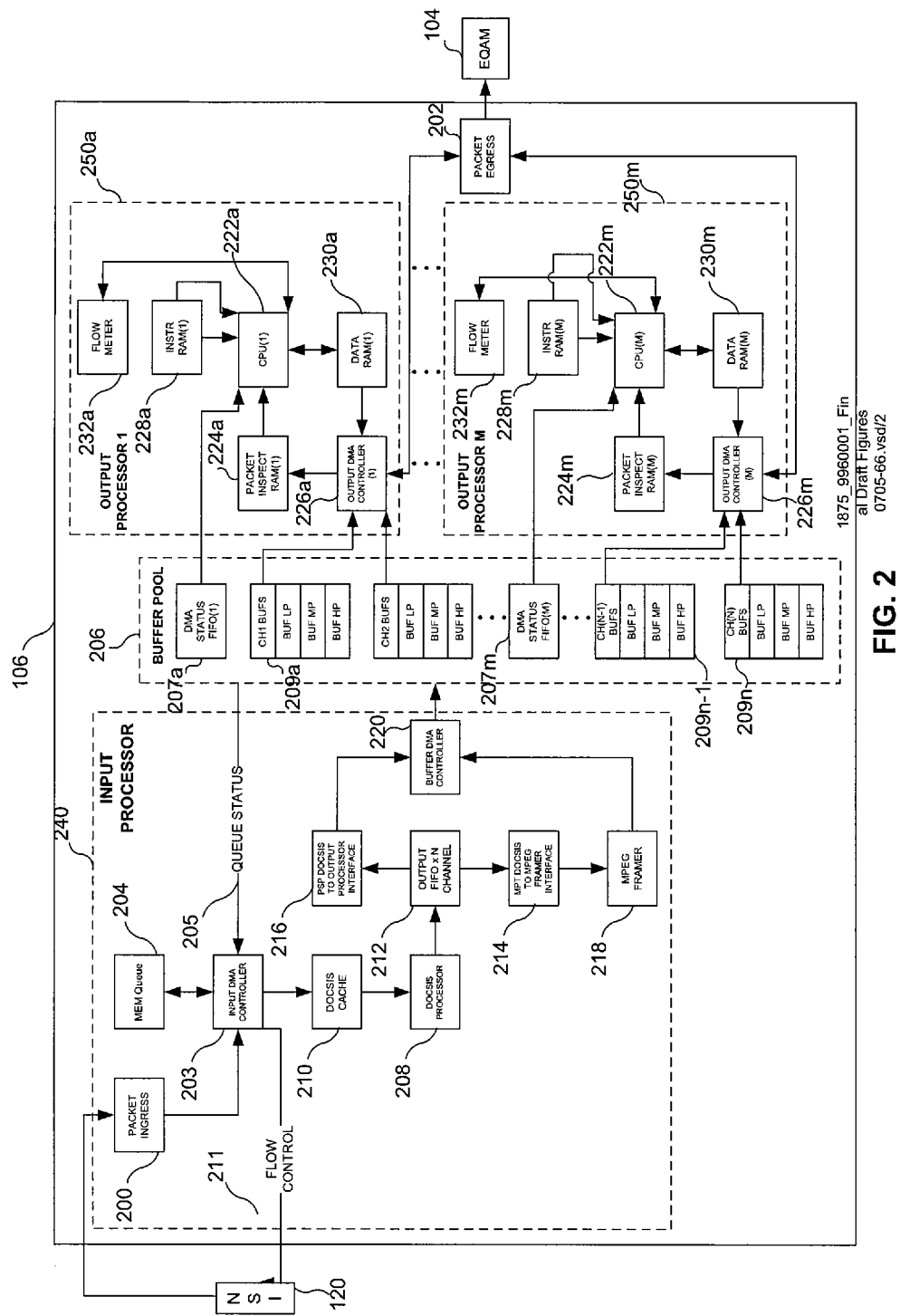
FIG. 2 is an example embodiment of a Downstream External PHY Interface (DEPI) core according to an embodiment of the invention.

FIG. 2 illustrates DEPI core 106 according to an embodiment of the present invention. DEPI core 106 sends packets received from network system interface 120 to edge quadrature amplitude modulator 104 in a configurable output format and at edge quadrature amplitude modulator 104 line rate. The output format of the packets is configurable by programming output processors 250a-m. In an embodiment the output format for packets leaving core 106 is Layer 2 Tunneling Protocol Version 3 (L2TPV3) format. In an embodiment, core 106 is used for line rate Field Programmable Gate Array (FPGA) or Application Specific Integrated Circuit (ASIC) applications. It is to be appreciated that even though core 106 is described with reference to DOCSIS system 100, it may be applied to any communication protocol where packets from multiple channels and multiple priorities per channel are to be processed with a high bandwidth protocol engine followed by formatting into packets by a programmable header generator or protocol encapsulation engine.

Ethernet packets from network system interface 120 enter core 106 via packet ingress module 200. Modules within core 106 convert these packets into DOCSIS compatible packets which are then encapsulated into one of two different formats: Moving Picture Experts Group Transport Stream (MPT) or Packet Streaming Protocol (PSP). The encapsulated packets are then formatted according to the L2TPV3 protocol. The L2TPV3 formatted packets are sent to edge quadrature amplitude modulator 104 via packet egress module 202. Core 106 is enabled to support data bursting during ingress at a much higher bandwidth than packets are processed and leave during egress thereby avoiding stalls. In an embodiment, network 128 is Gigabit Ethernet and network system interface 120 is a Gigabit Ethernet interface. It is to be appreciated by persons of skill in the art that in alternate embodiments network 128 and network system interface 120 could be used with any type network including but not limited to a Wide Area Network (WAN), Local Area Network (LAN) and Metropolitan Area Network (MAN).

Core 106 supports N channels of data with Q levels of priority per channel. Conventional DEPI cores employ multiple input processors with a processor associated with each channel. Core 106 comprises a single input processor 240 for the N channels and Q priorities per channel. Core 106 also comprises a buffer pool 206 and M output processors 250a-m. In the present embodiment, the N data channels with Q levels of priority are processed with M output processors 250a-m where an output processor 250 is enabled to support more than one channel. In alternate embodiments, the number of processors M may be more than, less than or equal to the number of channels N. Furthermore, there may be none, one or more than one priority levels Q per channel. It is to be appreciated by persons of skill in the art that the number of priority levels per channel is arbitrary and may be scaled to any number of priority levels in alternate embodiments. Likewise, it is to be appreciated that the number of channels and protocol encapsulation engines is also arbitrary.

3a. Input Processor

In the illustrated embodiment, input processor 240 comprises packet ingress module 200, input DMA controller 203, DOCSIS cache 210, MEM queue 204, DOCSIS processor 208, PSP DOCSIS to output processor interface 216, output FIFO 212, MPT DOCSIS to MPEG processor interface 214, MPEG framer 218 and buffer pool DMA controller 220.

Data enters core 106 via packet ingress module 200 and is transferred by input DMA controller 203 to queues in MEM queue 204. MEM queue 204 is partitioned to store data corresponding to N channels with each channel having three levels of priority, Low Priority (LP), Medium Priority (MP) and High Priority (HP). MEM queue 204 is preferably a memory with capacity and bandwidth to support ingress at the maximum packet rate or at edge quadrature amplitude modulator line rate. MEM queue 204 may be Double Data Rate (DDR) Random Access Memory (RAM). In an embodiment, there are distinct queues in MEM queue 204 for each channel and priority level.

Input DMA controller 203 is responsible for arbitration between the N channels and the Q priorities per channel. It is to be appreciated by persons of skill in the art that any arbitration mechanism may be used. In an embodiment, priority arbitration is used where higher priority queues always empty before lower priority queues empty. In another embodiment, round robin priority arbitration is used where each channel is assigned an even number of slots to empty a queue. Input DMA controller 203 buffers packet header and packet data in the DOCSIS cache 210. Caching portions of header information required for ordering decisions in DOCSIS cache 210 enables ordering decisions to be made without using up bandwidth in MEM queue 204. In an embodiment DOCSIS cache 210 serves as a First In First Out (FIFO) Protocol Data Unit (PDU) queue. DOCSIS cache 210 provides a continuous stream of data to high bandwidth DOCSIS processor 208 thereby preventing DOCSIS processor 208 from idling.

Input DMA controller 203 asserts flow control signal 211 to indicate the status of the queues in MEM queue 204 to network side interface 120 which is the data source for core 106. Network side interface 120 stops sending data in on queues which are full in MEM queue 204. For example, if the medium priority buffer for the first channel is full then the network side interface 120 stops sending data for that priority level of the first channel. Input DMA controller 203 can be programmed to provide the status of queues in MEM queue 204 via the flow control signal 211 when the queues reach a predetermined percentage or fraction of the maximum queue depth. In an embodiment a hysteresis function is used to provide an indication via flow control signal 211 when the queue depth drops below a specific percentage or fraction of the queue depth for a particular channel and priority level. In the present embodiment, the data source to core 106 is network side interface 120, however, in an alternate embodiment the data source may be a processor or another interface (not shown).

DOCSIS processor 208 is enabled to process N channels of data, each channel having Q levels of priority. DOCSIS processor 208 is enabled to time division multiplex its processor bandwidth across each of the N channels and Q priority levels per channel. Data buffered in DOCSIS cache 210 provides a continuous stream of data for DOCSIS processor 208.

DOCSIS processor 208 performs DOCSIS operations on packets received from DOCSIS cache 210 including but not limited to Payload Header Suppression, Baseline Privacy and DOCSIS header creation. Tag information on incoming packets indicates what processing operations are to be performed. Payload Header Suppression operation causes fixed fields in the packet header to be replaced with smaller tags. Baseline Privacy operation causes a large portion of the packet to be encrypted with either Data Encryption Standard (DES) or Advanced Encryption Standard (AES). DOCIS header creation operation causes insertion of DOCSIS Extended Headers and creation of DOCSIS header elements. DOCSIS header creation function also causes creation of a header Cyclic Redundancy Check (CRC).

The output of the DOCSIS processor 208 is packets formatted according to DOCSIS protocol which are stored in output FIFO 212. Output FIFO 212 is configured to accommodate packets corresponding to N channels and Q priorities per channel. Buffering in output FIFO 212 is used to prevent stalls in core 106. Output FIFO 212 also serves as an interface mechanism for subsequent processing of DOCSIS packets.

DOCSIS packets stored in output FIFO 212 are formatted according to one of Moving Picture Experts Group Transport Stream (MPT) format or Packet Streaming Protocol (PSP) formats. Packets in a channel, based on channel provisioning, are either assigned for MPT mode or PSP mode processing. The processing mode dictates the path of packets belonging to a channel from output FIFO 212 to either the MPT DOCSIS to MPEG framer interface 214 or PSP DOCSIS to output processor interface 216. A channel is provisioned for either MPT or PSP processing and all data on that channel is routed by output FIFO 212 to MPT DOCSIS to MPEG framer interface 214 or PSP DOCSIS to output processor interface 216 for processing accordingly.

The PSP format requires encapsulation of DOCSIS formatted packets in the L2TPV3 protocol. PSP is a layer 4/5 protocol that allows concatenation of multiple small packets into a larger packet and fragmentation of a large packet, exceeding the programmed Maximum Transmission Unit (MTU) size, into smaller packets. PSP DOCSIS to output processor interface 216 interfaces with output buffer DMA module 220 which places PSP formatted packets in respective priority and channel queues in buffer pool 206. PSP packets buffered in buffer pool 206 are processed by output processors 250 and sent to edge quadrature amplitude modulator 104 over a controlled latency network. Edge quadrature amplitude modulator 104 formats the PSP packets in the MPEG2 Transmission Convergence Layer protocol. The MPEG-2 Transmission Convergence layer protocol encapsulates the PSP formatted packets into MPEG2 frames. This allows MPEG2 encapsulated PSP data to be multiplexed with other MPEG streams on the same carrier on the forward path. For example, MPEG2 video and audio may be sent on the same carrier as MPEG2 encapsulated PSP data.

As described above, packets formatted according to DOCSIS protocol by DOCSIS processor 208 may be formatted according to MPT format instead of PSP format prior to being sent from core 106 to edge quadrature amplitude modulator 104. Packet header information is used to determine whether to process according to PSP or MPT format. The MPT format is a collection of MPEG2 packets into a single frame that is encapsulated in an L2TPV3 header. The MPT DOCSIS to MPEG framer interface 214 formats the DOCSIS packets according to the MPEG2 Transmission Convergence Layer protocol and sends the formatted packets to the MPEG framer 218. Since MPEG2 packets are fixed in size the number of MPEG2 packets (L) that can be placed in a L2TPV3 frame, is chosen to not exceed the Maximum Transmission Unit (MTU) size. MPEG framer 218 collects L MPEG2 packets. Since the size of each MPEG2 packet and the number of MPEG2 packets L in an L2TPV3 frame is fixed, there is no overhead of fragmentation and concatenation of frames in MPT mode processing. MPEG framer 218 inserts period synchronization messages between L2TPV3 frames to reduce jitter. Buffer pool DMA controller 220 places the framed data into single priority queues in buffer pool 206. The MPEG2 formatted packets collected in buffer pool 206 represent a bit stream going to edge quadrature amplitude modulator 104 for a given channel.

3b. Buffer Pool

In the embodiment illustrated in FIG. 2, buffer pool 206 comprises memory partitioned into N buffers 209*a-n* associated with corresponding N data channels. Each buffer 209 is further partitioned into Q levels of priority. In the present embodiment, there are three levels of priority: high (HP), medium (MP) and low level (LP) priorities. Buffer pool 206 also comprises M DMA status FIFOs 207*a-m* associated with corresponding M output processors 250*a-m*. Buffer pool 206 includes control logic (not shown) which provides queue status signal 205 to input DMA controller 203.

Data processed by DOCSIS processor 208 is buffered initially in output FIFO 212 and after further processing in buffer pool 206. If a corresponding buffer in buffer pool 206 becomes full then DOCSIS processor 208 may have to be stalled in order to prevent data overflow in buffer pool 206. To avoid stalling DOCSIS processor 208, buffer status from buffer pool 206 is supplied to input DMA controller 202 via Queue Status control signal 205. In this way, no packets are processed for channel and priority queues have no space to accept the packets. The Queue Status control signal 205 is generated by control logic (not shown) in buffer pool 206 that monitors status of buffers for each channel and each priority level within a channel. The queue status control signal 205 indicates whether a buffer in buffer pool 206 has capacity to receive another packet.

Buffer pool 206 also includes M DMA status FIFOs 207*a-m*. Buffer pool DMA controller 220 stores status events generated by the M DMA status FIFOs 207*a-m* associated with corresponding M processors 222*a-m*. Output buffer DMA 220 signals status events to each of M processors 222*a-m* via the stored status events in the M DMA status FIFOs 207*a-m*. The status information indicates that a packet of a particular size is placed within a particular buffer 209 of buffer pool 206. Information regarding the packet sizes queued in buffer pool 206 is retrieved by processors 222 from corresponding DMA status FIFOs 207 and L2TPV3 headers are generated for the relevant PSP or MPT mode.

3c. Output Processors

Output processors 250*a-m* encapsulate PSP or MPT formatted packets in an L2TPV3 format. Output processors 250*a-m* may also concatenate or fragment packets as needed. Output processors 250*a-m* each comprise a processor 222, instruction RAM 228, data RAM 230, packet inspect RAM 224, output DMA controller 226 and flow meter 232.

Output processors 250*a-m* execute instructions using processors 222*a-m*. The instructions are stored in the M instruction RAM units 228*a-m*. In an embodiment, instructions are stored in instruction RAM 228 from an external source before initialization of core 106. In an alternate embodiment, instruction RAM 228 may be reprogrammed with instructions at any time during operation of core 106. Instruction RAM 228 is multi-ported and a single instance of instruction RAM 228 supports multiple functions.

M units of data RAM 230a-m are used as a scratch pad memory by associated processors 222a-m and to store header templates and other constants required during processing. Sections of data RAM 230 are updated with header contents by corresponding processors 222.

Output processors 250 typically do not inspect the protocol data unit (PDU) of a packet stream to generate L2TPV3 headers. However, for applications where decisions based on PDU data are required, packet inspect RAM modules 224 are used. To facilitate inspection of certain packets, output DMA module 226 may be programmed to place packets in packet inspect RAM 224. Packet inspect RAM 224 allows messages to be sent in-band to processor 222 to enable provisioning of header templates and other channel parameters. Processor 222 may inspect Type of Service (ToS) bits in the header of a packet and make priority decisions based on the ToS bits.

Flow meters 232a-m include programmable timers, counters and threshold comparators (not shown) to facilitate rate shaping operations. Rate shaping is based in part on channel provisioning information. Flow meters 232a-m are programmable so as to not exceed a maximum modulator rate of edge quadrature amplitude modulator 104. In an embodiment the maximum modulator rate is not exceeded by using a "leaky bucket algorithm". In an embodiment, the "bucket" is a counter, a data structure or any other software construct for tracking ingress and egress of packets in and out of core 106. When the bucket is at full capacity, output processors 250 stop sending packets to edge quadrature amplitude modulator 104 or reduce the rate at which packets are sent. Since packets stop leaving core 106, buffer pool 206 may fill to capacity. Based on queue status signal 205 asserted by buffer pool 206, input DMA controller 202 may assert flow control signal 211 to stop NSI 120 from sending more data for channels and priorities that cannot be accommodated in buffers 209. Input DMA controller 202 stops loading packets into DOCSIS processor 208. As packets are gradually sent to edge quadrature amplitude modulator 104, the "bucket" empties and packet ingress module 200 again starts receiving packets from NSI 120. In an alternate embodiment, NSI 120 or a processor sourcing data to core 106 may control the flow of packets sent to core 106 based on queue status signal 205 and/or flow control signal 211.

Output DMA controllers 226a-m prefix output packets with the header contents stored in corresponding data RAMs 230a-m. Output DMA controllers 226 also append packet data to the output packet. In the case of concatenation, output DMA controllers 226 append multiple packets to an output packet. In the case of fragmentation, output DMA controllers 226 fragment a packet into multiple packets.

Packet egress module 202 interfaces output DMA controllers 226 to edge quadrature amplitude modulator 104. Packet egress module sends the Ethernet packets formatted according to PSP or MPT protocol and encapsulated in L2TPV3 layer to edge quadrature amplitude modulator 104.

4. DEPI SOFTWARE

In an embodiment, DEPI software running on processors 222 creates and appends custom headers having static and dynamic fields to DOCSIS Encapsulation Type (DET) packets entering core 106 from NSI 102 via packet ingress 200. The DEPI software is enabled to service multiple channels, each channel having multiple flows, with each flow having one of a high priority level, medium priority level and low priority level. Each priority level has an associated low threshold and high threshold. In an embodiment, the DEPI software uses a flow meter flow control mode in conjunction with a leaky bucket algorithm to control flow rate of DEPI packets. In another embodiment, the DEPI software uses a maximum transmission unit (MTU) flow control mode to control the flow rate of DEPI packets.

The DEPI protocol requires unique headers for each data flow which include dynamic fields. In an embodiment, the DEPI software sends packets to processors 222 for creation of the DEPI header. The DEPI software supports all forms of DEPI data headers as specified by the DEPI protocol. Furthermore, the DEPI software enables custom headers to be created for all packets. In an embodiment each output processor 222 creates headers for a single downstream channel associated with it.

In an embodiment, DEPI software creates packet headers based on the associated channel's configuration information. The channel information used to create headers includes but is not limited to Maximum Transmission Unit (MTU), data rate, high/low burst thresholds for each priority level, a header template, the header type and a table of unique field values for each flow (described below). The header also includes dynamic customizable fields including but not limited to UDP port identification, flow identification and session identification. In an embodiment, based on channel configuration information, DEPI software running on processors 222 performs the tasks including but not limited to: header creation, packet concatenation, packet fragmentation, rate limiting, DEPI latency measurement (DLM) and packet creation.

Each channel has three hardware priorities (high, medium, and low). In an embodiment, each priority has an associated buffer 209. Incoming packets are placed into their corresponding priority's buffer 209 and associated packet descriptors are placed in DMA status FIFO 207. The packet descriptor includes packet information including but not limited to packet size, packet type (PSP or MPT) and location of packet in buffer pool 206. An output processor 250 is enabled to access its associated FIFO 207 through FIFO status registers (not shown). Output processors 250 read the status register to get packet descriptors. A descriptor is de-queued from FIFO 207 by performing a write back to the status register. DEPI software stores headers and state information in data RAM 230. In an embodiment, two output processors share an instruction RAM 228.

Packet data from the priority buffers 209 and header data from data RAM 230 is sent to packet egress 202 via DMA controller 226. To initiate a data transfer, DEPI software is enabled to provide a packet descriptor to the DMA controller 226. DMA controller in turn performs the data transfer to packet egress module 202 and proceeds to the next descriptor located in the next sequential memory location of FIFO 207, or in a location indicated by an extended descriptor, until it encounters a bit indicating end of packets to be transmitted for a particular priority level. DMA controller 226 can also transfer data from priority buffers 209 to data RAM 230 to retrieve command packets. DEPI software can act on the command in the command packet after it has been copied to data RAM 230. DMA controller concatenates packets based on information in packet descriptors and sends the packets out.

Flow meter 232 is enabled to perform calculations for rate shaping of output packets of a particular channel. In an embodiment, a leaky bucket algorithm is used to rate shape the channel. When a packet is sent to DMA controller 226 for transmission, DEPI software updates a bucket size parameter associated with flow meter 232 with the number of bytes in the packet without including the header size. Bucket size parameter is decremented at the output rate of the channel thereby providing DEPI software with an estimate of an oversubscription level.

4a. Configuring Processors, Channels, Header Templates and Flows

In an embodiment output processors 250a-b are held in reset at startup while core 106 is in initialization mode. Processors 222 read instruction code from a serial Electrically Erasable Programmable Read Only Memory (EEPROM) and load it into instruction RAM 228. Output processors 250 are enabled subsequent to loading instruction code. Data channels are blocked from receiving packets until each channel is configured as described below.

In an embodiment, output processors are initialized from a remote host via packets received from the NSI 120. Furthermore, using control DET packets to access a register interface (not shown) of processor 222, associated instruction RAM 228 can be updated. Subsequent to a software upgrade, output processors 250 are restarted for the software update to take effect.

DEPI software configures channels by setting channel information fields, priority information fields and flow information fields. Channel information fields include but are not limited to maximum transmission unit, header template, header size, header flags (e.g. PSP, UDP, IPv6 and 802.1Q). Priority information fields include but are not limited to a high threshold and a low threshold. Flow information fields include but are not limited to IP DS byte fields, IP TTL fields, IP Checksum, UDP Source and Destination Ports, L2TPv3 data sub-layer header, L2TPv3 DLM sub-layer header and initial sequence number.

In an embodiment, channels are configured over the network 128 through command DET packets via NSI 120. A packet descriptor of a packet indicates whether it is a command packet. Processor 222 detects the command packet based on the descriptor and requests output DMA controller 226 to copy the associated command packet to packet inspect RAM 224. Output processor 222 processes other packets while the command packet is copied to packet inspect RAM 224. Once the packet is copied to packet inspect RAM 224, the command is processed. A command packet can read/write the packet inspect RAM 224 and initiate a DLM packet transmission. For read commands, a read header is supplied prior to the first read command in the packet. A read command can be used as an ACK for flow control.

Memory write commands are used for channel provisioning where tables shown below are written to set channel characteristics. In an embodiment, a channel is disabled prior to being configured (except for MTU mode). When a channel is disabled, current channel provisioning is maintained in data RAM 230, but any packets descriptors in data RAM 230 are lost. Changing the maximum transmission unit size is permitted without disabling the channel, but any pending packets already formed will be transmitted using the previous maximum transmission unit. A channel does not need to be disabled when provisioning a new flow. Packets on a new flow may not be forwarded to processor 222 until the new flow has been provisioned. Provisioning new flows without disabling a channel allows running traffic on existing flows. According to an embodiment of the invention, the tables below are programmable and are used to configure channels, flows and header templates.

4b. Tables and Templates

Channel Table

In an embodiment, channel table shown below in table 1 is used to program channel settings.

TABLE 1

| 31 | 0 |
|---|---|
| Channel Flags | |
| Header Size | |
| MTU (minus CRC) | |

The channel flags entry stores flags for header types and is illustrated in table 2 below. The header size field is used to set the number of bytes in the header template. The header size field does not include the two-byte segment headers for the PSP sub-layer header. The maximum transmission unit (MTU) field indicates the maximum packet size and does not include the four-byte cyclic redundancy check (CRC) code.

In an embodiment, the 32 byte channel flags field is shown below in table 2.

TABLE 2

| 31 | 5 | 4 | 3 | 2 | 1 | 0 |
|---|---|---|---|---|---|---|
| Not used (set to zero) | | Flow Ctrl | PSP | UDP | IPv6 | 802.1Q |

In table 2 above, the flow control field is used to specify the method used to determine when packets are transmitted. Core 106 in "Flow meter mode" uses a leaky bucket flow meter algorithm as described herein. In "MTU mode", core 106 sends packets based on their packet size as described herein. Flow control set to 0 indicate flow control mode and set to 1 indicates MTU mode.

The PSP field is used to indicate MPT mode if it is set to 0 and PSP mode if it is set to 1.

The UDP field is used to indicate that no UDP header is present if it is set to 0 and a UDP header is present if it is set to 1.

The IPv6 field is used to indicate use of IPv6 mode if set to 1 and IPv4 mode if set to 0.

The 802.1Q field is used to indicate that a 802.1Q header is present if set to 1 and not present if set to 0.

Header Templates

The header template data contains the header fields which are static across all flows. All dynamic fields are set to zero. In an embodiment, for processing efficiency, data used to prepare packet headers is copied to one of two memory locations header buffer 0 (not shown) and header buffer 1 (not shown) in output processor 250.

In an embodiment, header data is separated into two part with Ethernet header being separated from the rest of the header in order to keep 32-bit alignment. Table 3 below shows an example header format according to an embodiment of the invention.

TABLE 3

| 31 | 0 |
|---|---|
| Ethernet Destination Address | |
| Ethernet Destination Address (continued) | Ethernet Source Address |
| Ethernet Source Address (continued) | |
| Ethernet Type | Unused (set to zero) |
| Remaining Header Data . . . | |

As seen above in table 3, the Ethernet header is separated from rest of the header data to maintain 32-bit alignment.

In an embodiment, the header template includes but is not limited to the following dynamic or configurable fields: Internet Protocol (IP) Differentiated Service (DS) Byte, IP Total Length, IP Time to Live (TTL) Field, IP Checksum, User Datagram Protocol (UDP) Source and Destination Ports, UDP Length, UDP Checksum, L2TPv3 and Sub-layer Header. In an embodiment the header template is specified with configurable fields set to zero.

Priority Tables

In an embodiment, each of the three priorities (high priority, medium priority and low priority) has associated low and high thresholds which are used for the leaky bucket algorithm described below. Each priority table has the format shown in table 4 below.

TABLE 4

| 31 | 0 |
|---|---|
| Low Threshold | |
| High Threshold | |

It is to be appreciated the levels of priorities and the number of thresholds per priority is a design choice and may be arbitrary.

Flow Tables

In an embodiment, output processors 250 may support up to eight flows per channel. Accordingly, dynamic header data is maintained in separate flow tables. There are two types of flows, default flows and specific flows. The default flows are the flows assigned to each of the three priority queues in hardware. The specific flows are not tied to a priority queue and they are identified by a flow reference in a DET header, which is distinct from the flow ID in a DEPI sub-layer header. In an embodiment, the flow tables are: Default Low Priority Flow Table, Default Medium Priority Flow Table, Default High Priority Flow Table, Specific Flow Table 1, Specific Flow Table 2, Specific Flow Table 3, Specific Flow Table 4 and Specific Flow Table 5.

In an embodiment, each of the flow tables has the format shown below in table 5.

TABLE 5

| 31 | 0 |
|---|---|
| IP DS Field | |
| IP TTL Field | |
| IP Checksum | |
| UDP Ports | |
| Data Sub-layer Header | |
| DLM Sub-layer Header | |
| Starting Sequence Number | |
| Unused (set to zero) | |

The IP DS field is used to set the first 32-bit word of the IP header. For IPv4, the total length field is to be set to zero.

The IP TTL field for IPv4 is used to set the third 32-word of the IP header with the checksum set to zero. For IPv6, this is the second 32-bit word of the IP header with the payload length field set to zero.

The IP Checksum field is used to set the IP header checksum which is calculated with the length field set to zero and is used for IPv4 only.

The UDP Ports field is used to set the first 32-bit word of the UDP header.

The Data Sub-layer Header field is used to set the first 32-bit word of the L2TPv3 data sub-layer header. The sequence number is to be set to zero. For PSP mode, the segment count is to be set to zero.

The DLM Sub-layer Header field is used to set the L2TPv3 DLM sub-layer header.

The Starting Sequence Number field is used to set the starting sequence number minus one for the L2TPv3 data sub-layer header.

4c. Processor Commands

Commands are sent to processors 222 in the form of DET packets received via NSI 120. Commands packets follow the same path as data packets and therefore they may be sent to any of the available hardware queues in buffer pool 206. Commands are recognized by DEPI software based on their header information. DEPI software upon detecting a command requests output DMA controller 224 to copy the command packet into packet inspect RAM 224 where processor 222 can decode and execute the command. Processors 222 may be directed by commands described herein to perform tasks including but not limited to reading/writing memory, enabling/disabling a channel, sending a DLM packet, setting a channel's rate and returning the current software version. Each Ethernet header and DET header has the following format as show below in table 6.

TABLE 6

| Ethernet Header | | | DET Header | | |
|---|---|---|---|---|---|
| 6 bytes | 6 bytes | 2 bytes | 1 byte | 2 bytes | 9 bytes |
| DA | SA | EtherType | QNum | ChanLen | Unused (set to zero) |

The DA field is used to indicate a destination MAC address.
The SA field is used to indicate a source MAC address.
The EtherType field is used to indicate a DET type.
The QNum field is used to indicate a queue number and flags. QNum field is 8 bits long with bit 7 being a downstream indicator (typically set to zero), bits 6:5 indicating DET Type (set to 1 for processor commands), bits 4:3 indicate downstream queue (0 indicates reserved, 1 indicates high priority, 2 indicates medium priority and 3 indicates low priority) and bits 2:0 are unused and typically set to zero.

The ChanLen field is used to indicate packet length and channel number. Bits 15:13 of ChenLen field indicates channel numbers from 0-7 and bits 12:0 indicate packet length which is the number of bytes in payload of a packet.

Command Format

Processor 222 commands begin on a four-byte boundary relative to the start of the command packet payload. A packet may have multiple commands. In an embodiment, the size of the command payload can be up to 64 words. Commands have the format shown below in table 7.

TABLE 7

| 0 | 1 | 2 | 3 |
|---|---|---|---|
| 0 | Type | 0 | Parameter |
| | Command Data | | |
| | Command Data (cont'd) | | |

The Type field if set to 0 indicates a write command, if set to 1 indicates a read command, if set to 2 indicates a return header command, if set to 3 indicates a disable channel command, if set to 4 indicates an enable channel command, if set to 5 indicates a send DLM command, if set to 6 indicates a set rate command, if set to 7 indicates a version command.

The parameter field is specific to the type of command indicated by the type field above.

The Command Data field is specific to the type of command indicated by the type field above and has optional type specific data that must ends on a four-byte boundary.

In an embodiment read, return header, send DLM and version commands can only appear once in a single command packet. In an embodiment, the read and version commands are mutually exclusive and only on can be present in a single command packet. In yet another embodiment, the return header command must be sent before the read and version commands.

Write Command

The write command is used to write to the data RAM 230 and has the format shown below in table 8.

TABLE 8

| 0 | 1 | 2 | 3 |
|---|---|---|---|
| 0 | 0 | 0 | Number of Words |
| | | Starting Address | |
| | | First Data Word | |
| | | Data (cont'd) | |

The parameter field is used to specify the number of 32-bit words to be written. The first word of the command data field specifies the starting address and the following words are the data to be written.

Read Command

The read command is used to read the contents of data RAM 230 and has the format shown below in table 9.

TABLE 9

| 0 | 1 | 2 | 3 |
|---|---|---|---|
| 0 | 1 | 0 | Number of Words |
| | | Starting Address | |

The parameter field is used to specify the number of 32-bit words to be read. The first word of the command data specifies the starting address. The resulting data is returned in a packet containing the header specified by the return header command. The return header command must be sent prior to the first read command so as to indicate the header to be used for the return packet. In an embodiment, only one read command is allowed per command packet.

Return Command

The return command is used to specify the return header to be used for return packets and has the format shown below in table 10.

TABLE 10

| 0 | 1 | 2 | 3 |
|---|---|---|---|
| 0 | 2 | 0 | Number of Bytes |
| | | Header Data | |
| | | Header Data (cont'd) | |

The parameter field is used to specify the number of bytes in the return header. The header data is specified in the command data field and is at least 20 bytes long. If the header data does not end on a four-byte boundary, then it is padded to the next boundary. The return header command occurs prior to the first read or version command. This command may be used without a read or version command present, resulting in a return packet with just the header data which serves as an acknowledgement (ACK) packet.

Disable Channel Command

The disable channel command is used to stop an output processor 250 from servicing packets on a particular channel and has the format shown below in table 11.

TABLE 11

| 0 | 1 | 2 | 3 |
|---|---|---|---|
| 0 | 3 | 0 | 0 |

Enable Channel Command

The enable channel command is used to enable packet processing for a particular channel and has the format shown below in table 12.

TABLE 12

| 0 | 1 | 2 | 3 |
|---|---|---|---|
| 0 | 4 | 0 | 0 |

DLM Command

In an embodiment, a DLM command is used to measure the round-trip delay for a packet. A DLM packet has the same header as one of the data flows with the exception of the sub-layer header. According to an embodiment of the invention, packet egress module 202 places a first time stamp in the sub-layer header prior to transmission of the packet to EQAM 104. The receiving end places a second time stamp upon receiving the DLM command packet. The difference between the second and first time stamps yields the round-trip delay in the network. The DLM command packet has the format shown below in table 13.

TABLE 13

| 0 | 1 | 2 | 3 |
|---|---|---|---|
| 0 | 5 | 0 | Flow Reference |

The parameter field is used to specify the flow reference value which indicates which flow table will be used to form the header for a packet. The flow reference is distinct from the DEPI header's flow ID field. A flow reference value of 0x00 indicates that a default low priority flow, a value of 0x10 indicates a default medium priority flow and a value of 0x20 indicates a default high priority flow. The values 0x01 to 0x05 indicate a specific type of flow which corresponds to the flow reference field in the data packet of a DET header.

Set Rate Command

The set rate command is used to set the rate of an associated channel and has the format shown below in table 14.

TABLE 14

| 0 | 1 | 2 | 3 |
|---|---|---|---|
| 0 | 6 | 0 | 0 |
| | | Rate | |

The rate value is calculated as:

$$\text{Rate} = 2^{32} * \text{rate\_in\_megabits\_per\_second} / (143.36 * 8)$$

Version Command

The version command is used to get the version number of the software running on processors 222 and has the format shown below in table 15.

TABLE 15

| 0 | 1 | 2 | 3 |
|---|---|---|---|
| 0 | 7 | 0 | 0 |

The version command is preceded with a return header command in the same packet. The value returned is a 32-bit word containing the version number in the form X.Y.Z as shown below in table 16.

TABLE 16

| 0 | 1 | 2 | 3 |
|---|---|---|---|
| 0 | X | Y | Z |

4d. Example Memory Layout

In an example embodiment, memory for the above tables is in the layout illustrated in table 17 below.

TABLE 17

| | |
|---|---|
| 0x000 | Channel Table |
| 0x003 | Low Priority Table |
| 0x005 | Medium Priority Table |
| 0x007 | High Priority Table |
| 0x009 | Default Low Priority Flow Table |
| 0x011 | Default Medium Priority Flow Table |
| 0x019 | Default High Priority Flow Table |
| 0x021 | Specific Flow Table 1 |
| 0x029 | Specific Flow Table 2 |
| 0x031 | Specific Flow Table 3 |
| 0x039 | Specific Flow Table 4 |
| 0x041 | Specific Flow Table 5 |
| 0x049 | Header Buffer 0 |
| 0x06B | Header Buffer 1 |
| 0x08C | End |

4e. Process Loop

Data packets entering core 106 are processed in PSP or MPT mode by input processor 240 and transferred to output processors 250 via buffers 209 in buffer pool 206. When an entire packet is placed in one of the buffers 209 a packet descriptor is placed in an associated DMA status FIFO 207a. DEPI software running on each of processors 222 maintains an internal ingress descriptor ring (not shown) and egress descriptor ring (not shown) in data RAM 230 for each priority level. The ingress and egress descriptor rings are serviced according to the flowcharts described in FIGS. 3A-C below.

Figure 3A:
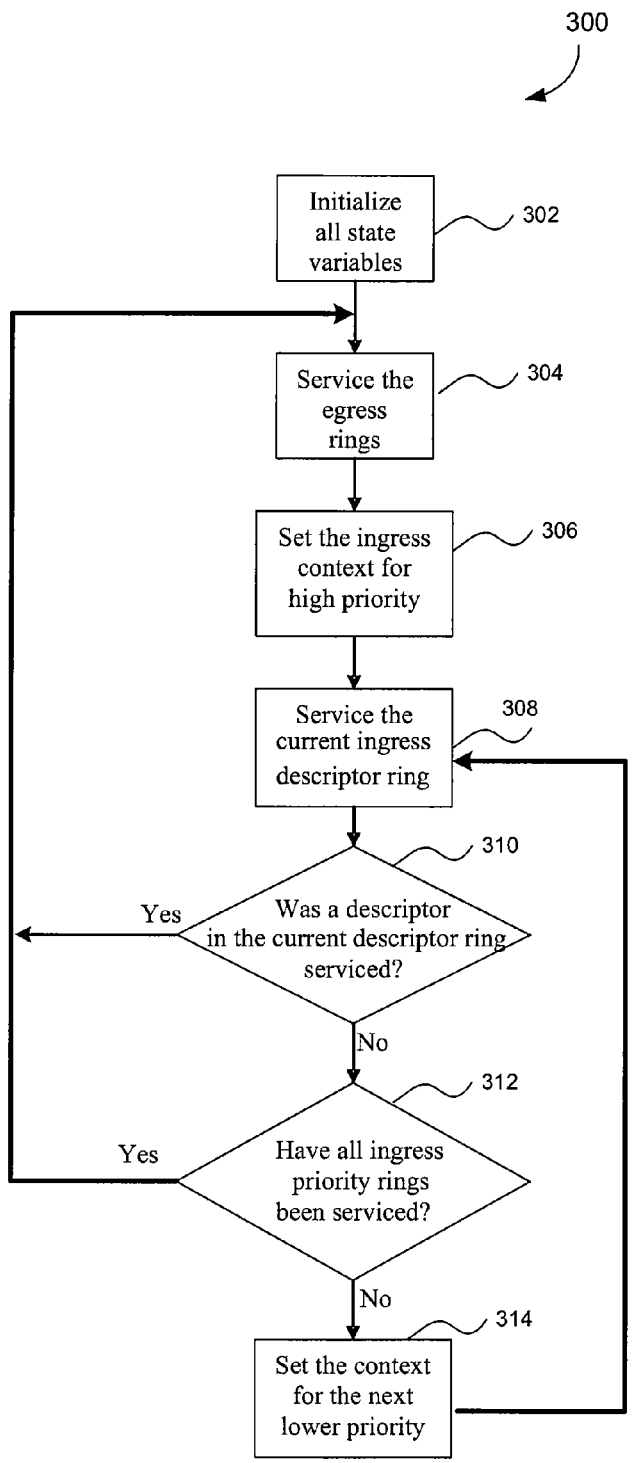
FIG. 3A illustrates a flowchart showing steps for servicing ingress and egress descriptor rings of Ethernet packets received on multiple data channels, each channel having multiple priority levels in either of PSP or MPT formats according to an embodiment of the invention.

FIG. 3A illustrates a flowchart 300 showing steps for servicing ingress and egress descriptor rings of Ethernet packets received on multiple data channels, each channel having multiple priority levels in either of PSP or MPT formats according to an embodiment of the invention. Flowchart 300 will be described with reference to the example operating environment illustrated in FIG. 2. In an embodiment, DEPI software causes processor 222 to perform the steps illustrated in FIG. 3A. However, the flowchart is not limited to that embodiment. Note that some steps shown in flowchart 300 do not necessarily have occur in the order that is shown.

In step 302, all state variables in use are initialized. For example, processor 222 initializes all state variables in one or more of the channel, header, priority and flow tables described above. The tables may be initialized based on commands to processor 222 that are received via Ethernet from a source external to core 106.

In step 304, the egress descriptor rings are serviced. For example, processor 222 services egress descriptor rings according to the steps of flowchart 340 in FIG. 3C described below.

In step 306, the context is set to service the highest priority ingress descriptor ring. For example, processor 222 sets the context to service the highest priority ingress descriptor ring.

In step 308, the ingress descriptor ring selected in step 306 is serviced. For example, processor 222 services the ingress descriptor ring according to the steps of flowchart 320 in FIG. 3B described below.

In step 310, it is determined whether a descriptor in the ingress descriptor ring from step 308 was serviced. For example, processor 222 determines whether a descriptor in the ingress descriptor ring from step 308 was serviced.

If it is determined in step 310 that a descriptor was serviced, then control proceeds to step 304.

If it is determined in step 310 that a descriptor was not serviced, then control proceeds to step 312.

In step 312, it is determined whether all ingress descriptor rings have been serviced. For example, processor 222 determines whether all ingress descriptor rings have been serviced.

If it is determined in step 312 that all ingress descriptor rings have been serviced then control proceeds to step 304.

If it is determined in step 312 that all ingress descriptor rings have not been serviced then control proceeds to step 314.

In step 314, the context is set to service the next lower priority, with respect to the priority level of the ring serviced in step 308, ingress descriptor ring. For example, processor 222 sets the context to service the next lower priority ingress descriptor ring. Control proceeds to step 308.

4f. Ingress Flows

In an embodiment, DEPI software maintains three head pointers and a tail pointer for each ingress descriptor ring. The first head pointer is referred to as the RingHead. RingHead indicates the oldest descriptor that is either to be handed to output DMA controller 226 or to receive acknowledgement that the associated packet has been transmitted.

The second head pointer is referred to as the RingTxHead. The RingTxHead pointer is used to determine the location of the next packet descriptor to be transmitted by the output DMA controller 226.

The third head pointer is referred to as the RingRxHead. The RingRxHead pointer points to the first descriptor in the current descriptor ring being serviced by the ingress process. RingRxHead is used to determine if the ingress process in flowchart 320 is building the next packet to be transmitted at RingTxHead.

The tail pointer is referred to as RingTail. The RingTail points to the next available descriptor for incoming packets in an ingress descriptor ring being serviced.

The descriptor rings are serviced in order of priority. Before retrieving any new packets, DEPI software fragments any oversized packets at the tail of the descriptor ring being serviced. Oversized packets at the tail of a descriptor ring are used to start a new DEPI packet with any previous packets being marked as complete and ready for transmission. The DMA status FIFO associated with a flow is then checked for data. When a new a packet descriptor is present in the DMA status FIFO, DEPI software determines if there is an entry available on its corresponding descriptor ring. At least two entries must be available on the corresponding descriptor ring in order to facilitate fragmenting the packet descriptor. If there are at least two entries on the ring, the descriptor is placed in one of the entries of the descriptor ring and de-queued from the associated DMA status FIFO 207.

When a packet is placed on a descriptor ring, DEPI software attempts to concatenate it with a packet descriptor on the tail of the descriptor ring if one is present. In an embodiment, concatenation is not performed if the ring is empty, the last packet is flagged as complete, the last packet has a different flow reference, if concatenating the minimum allowed fragment length (e.g. 4 bytes for PSP mode, 188 bytes for MPT mode) would make the packet larger than the maximum transmission unit specified for that packet or if the new packet would have to be fragmented, but is too small to produce two fragments greater than or equal to the minimum allowed fragment length.

If concatenation cannot be performed, the last packet descriptor on the descriptor ring is flagged as complete and ready for transmission when the egress process flow rules permit it.

In PSP mode, the last data packet in a DEPI packet may be fragmented based if it exceeds MTU size, if the packet is at a 32-bit boundary and if a resulting fragment(s) contains at least four bytes. When a descriptor packet is to be fragmented, it is copied to the descriptor ring twice with adjusted length and address fields based on the fragment size. The first fragment is flagged as complete and ready for transmission.

Figure 3B:
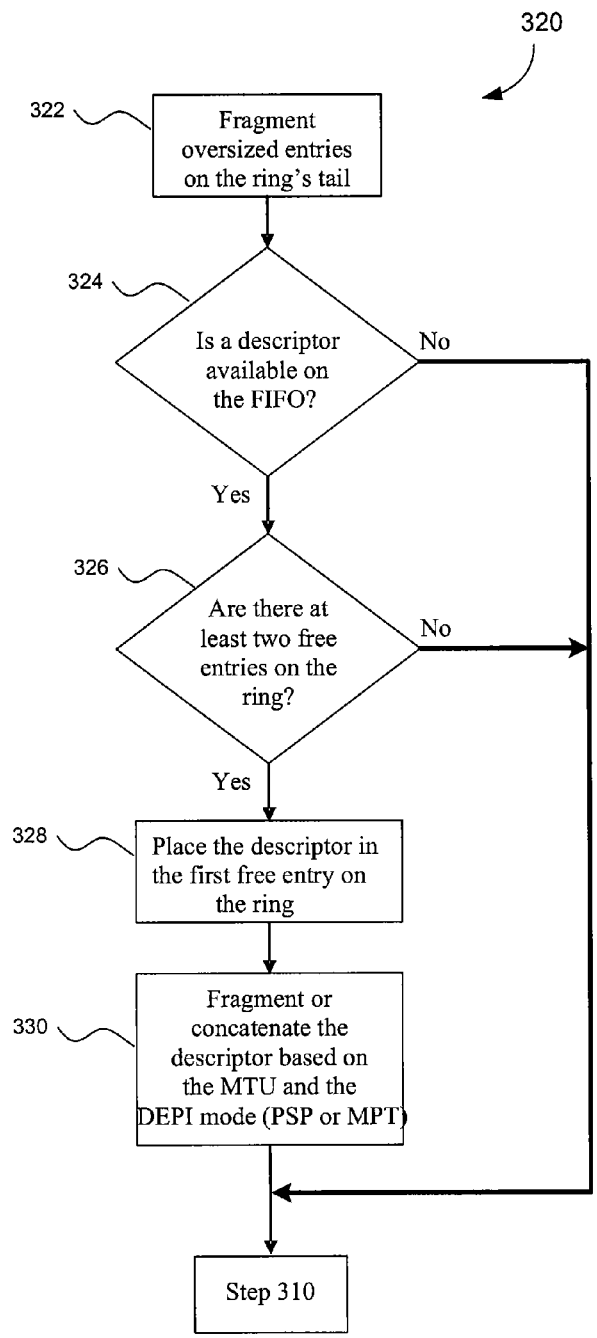
FIG. 3B illustrates a flowchart showing steps for processing an ingress descriptor ring according to an embodiment of the invention.

FIG. 3B illustrates a flowchart 320 showing steps for processing an ingress descriptor ring according to an embodiment of the invention. Flowchart 320 will be described with reference to the example operating environment illustrated in FIG. 2. In an embodiment, DEPI software causes processor 222 to perform the steps illustrated in FIG. 3B. However, the flowchart is not limited to that embodiment. Note that some steps shown in flowchart 320 do not necessarily have occur in the order that is shown.

In step 322, oversized descriptors in the tail of the current descriptor ring being serviced are fragmented. For example, processor 222 fragments oversized descriptors in the tail of the current descriptor ring being serviced.

In step 324, it is determined whether a descriptor is present in a DMA status FIFO queue corresponding to the priority level of the current ingress descriptor ring being serviced. For example, processor 222 determines whether there is a descriptor present in DMA status FIFO 207 corresponding to the priority level of the current ingress descriptor ring being serviced.

If it is determined that a descriptor is not present in a DMA status FIFO queue corresponding to the priority level of the current ingress descriptor ring being serviced then control proceeds to step 310 of flowchart 300.

If it is determined that a descriptor is present in a DMA status FIFO queue corresponding to the priority level of the current ingress descriptor ring being serviced then control proceeds to step 326.

In step 326, it is determined whether at least two empty entries are available in the current descriptor ring being serviced. For example, processor 222 determines whether there are at least two empty entries available in the current descriptor ring being serviced.

If it is determined that at least two empty entries are not available in the current descriptor ring being serviced then control proceeds to step 310 of flowchart 300.

If it is determined that at least two empty entries are available in the current descriptor ring being serviced then control proceeds to step 328.

In step 328, the descriptor is placed in the first available entry in the current ingress descriptor ring being serviced and de-queues the descriptor from a DMA status FIFO queue. For example, processor 222 places the descriptor in a first entry of the ingress descriptor ring and de-queues the descriptor from DMA status FIFO 207.

In step 330, the descriptor placed in the first entry of the current descriptor ring in step 328 is concatenated with other descriptors or fragmented based on the size of its associated packet and MPT or PSP processing mode for the packet. For example, processor 222 concatenates or fragments the descriptor based on the size of its associated packet and whether the packet is to be transmitted using MPT or PSP mode. Control proceeds to step 310 of flowchart 300.

4g. Egress Flows

DEPI software determines when a packet can be transmitted based on the packet size, the flow mode and the availability of a header buffer to prepare a header for the packet. The descriptor rings are serviced on a priority basis, starting with the highest priority rings and only continuing to the next lower priority ring when no more packets can be transmitted at the current priority level either due to flow control rules or due to packet unavailability.

Prior to checking for the availability of packets on any of the descriptor rings, a descriptor cleanup routine is performed. In the cleanup routine, any packet descriptors that the output DMA controller 226 has released are made available to incoming packets.

When a packet is ready to be transmitted a custom header is created for the packet. There are two header buffers for each channel for building the packet header. Each header buffer has an associated set of packet descriptors stored in DMA status FIFO 207. A bit in the packet descriptor for the header indicates which of the two header buffers is being used to create a header for the packet. The use of two header buffers allows processors 222 to create a header for a first packet while a second packet is being transmitted.

After it has been determined that a header buffer is available to create a header, the descriptor ring being serviced is checked for further packet descriptors. If there is a packet descriptor on the descriptor ring being serviced, then the packet is transmitted if the flow control mode permits transmission. In MTU flow control mode, the packet simply has to be flagged as ready for transmission as described above in the ingress flow. In flow meter flow control mode, the flow meter and priority thresholds are used to determine if the packet must be transmitted as described below. If the packet is to be transmitted, then the location of the first data packet descriptor (Tx head) is copied to the header's last packet descriptor. The header buffer is updated with the flow specific data from an associated flow table (as shown above in table 5) and the header's packet descriptor is sent to output DMA controller 226 for transmission. Output DMA controller 226 has a DMA completion register associated with each of the buffers which is updated when a packet is transmitted. A header buffer flag for the first header buffer that was being used to create a header is set to point to the second header buffer in preparation for the next packet to be transmitted. The Tx head pointer is updated to point to the packet descriptor following the descriptor of the transmitted packet. The descriptor for the transmitted packet is made available for new incoming packets.

Figure 3C:
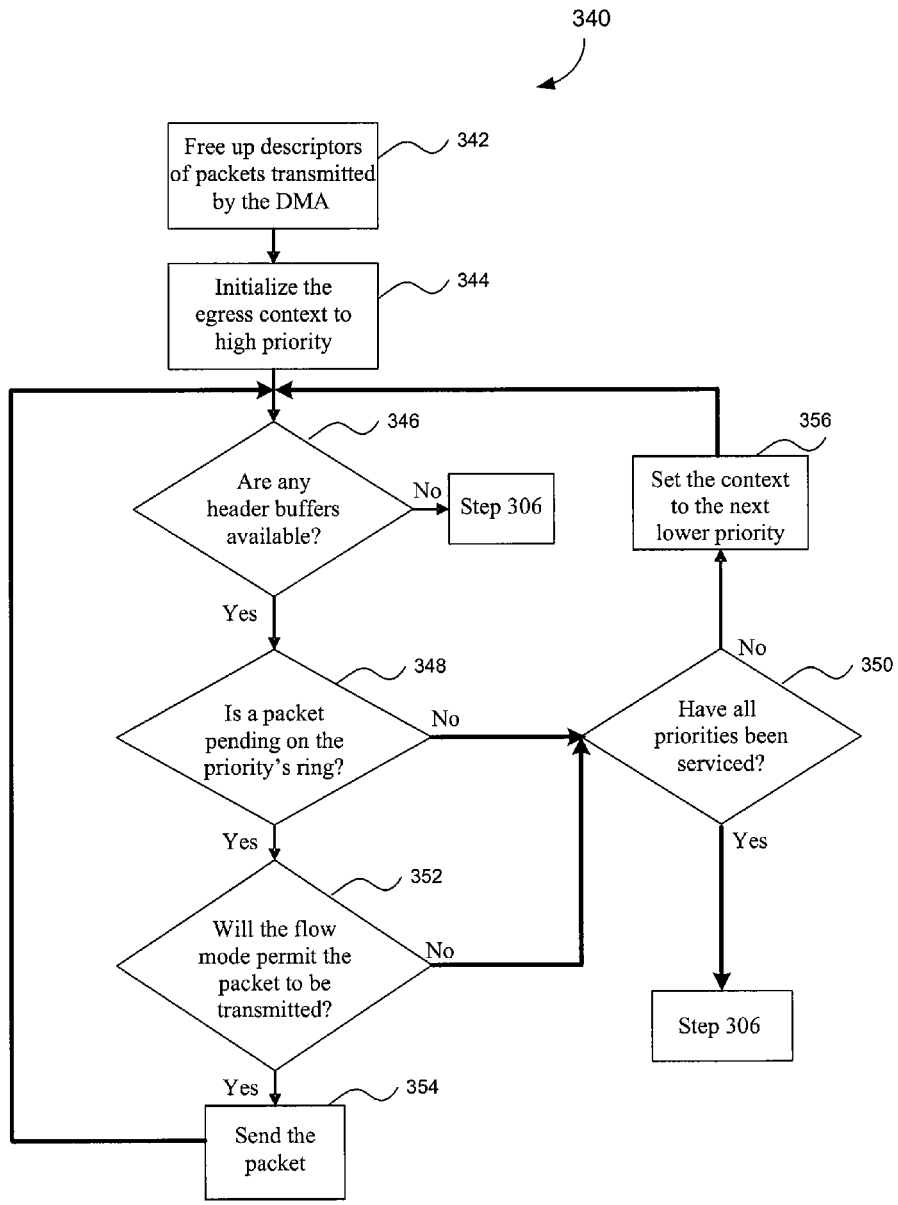
FIG. 3C illustrates a flowchart showing steps for processing egress descriptor rings according to an embodiment of the invention.

FIG. 3C illustrates a flowchart 340 showing steps for processing egress descriptor rings according to an embodiment of the invention. Flowchart 340 will be described with continued reference to the example operating environment depicted in FIG. 2. In an embodiment, the steps illustrated in FIG. 3C are performed by DEPI software running on processor 222 illustrated in FIG. 2. However, the flowchart is not limited to that embodiment. Note that some steps shown in flowchart 340 do not necessarily have to occur in the order shown.

In step 342, packet descriptors for transmitted packets are made available to incoming packets. For example, packet descriptors stored in DMA status FIFO 207 that have been serviced by output DMA controller 226 are made available to incoming packets.

In step 344, the context is set to service the highest priority egress descriptor ring. For example, processor 222 sets the context to service the highest priority egress descriptor ring.

In step 346, it is determined whether a header buffer is available for creating and storing a header. For example, processor 222 determines if a header buffer is available.

If it is determined that a header buffer is not available, then control proceeds to step 306 in flowchart 300.

If it is determined that a header buffer is available, control proceeds to step 348.

In step 348, it is determined whether a packet in the current descriptor ring being serviced is available for transmission. For example, processor 222 determines whether a packet in the current descriptor ring being serviced is available for transmission.

If it is determined in step 348 that a packet is not available for transmission then control proceeds to step 350.

If it is determined is step 348 that a packet is available for transmission then control proceeds to step 352.

In step 352, it is determined whether the packet from step 352 can be transmitted based on flow control mode and MPT or PSP processing mode. For example, processor 222 determines whether the packet can be transmitted based on flow control mode and MPT or PSP processing mode. In an embodiment, a flag is set in the associated packet descriptor to indicate whether the packet is ready for transmission.

If it is determined that the packet is not ready for transmission, then operation proceeds to step 350.

If it is determined that the packet is ready for transmission, then operation proceeds to step 354.

In step 354, a header is created, appended to the packet and the packet is transmitted. For example, processor 222 creates a header that is stored in the header buffer. The header is appended to the packet and the packet is transmitted output DMA controller 226.

In step 350, it is determined whether all egress priority queues have been serviced. For example, processors 222 determines whether all egress priority queues have been serviced.

If it is determined in step 350 that all three priorities have been serviced then control proceeds to step 306 of flowchart 300.

If it is determined in step 350 that all three priorities have not been serviced then control proceeds to step 356.

In step 356, the context is set to service the next lower priority, with respect to the current priority, egress descriptor ring. For example, processor 222 sets the context to service the next lower priority egress descriptor ring. Control proceeds to step 346.

4h. Flow Control Modes

In an embodiment, packets are transmitted by output DMA controller 226 based on the flow control mode (Flow meter mode or MTU mode) in effect fort a particular channel being serviced. Flow control mode is set as shown above in table 2.

Flow Meter Mode

When the flow control mode is set to flow meter mode, processor 222 uses a leaky bucket algorithm to control the flow rate of the three priorities queues for packets. Each priority level is configured during startup with a low and high threshold (shown in table 4) which are used in conjunction with a bucket size maintained by flow meter 232. When packets are not being transmitted, successive packet belonging to the same flow are concatenated up to the MTU size specified in table 1 above. In an embodiment, concatenation takes place only if bucket size is above a predetermined threshold. In PSP mode, a packet may be fragmented, if necessary to a achieve the largest possible packet size without exceeding the MTU size. In an embodiment, packet size is lesser than the actual MTU size due to fragmentation requirements described herein. In an embodiment, processor 222 determines whether or not a packet may be transmitted in flow meter mode based on the steps described below in FIG. 4.

Figure 4:
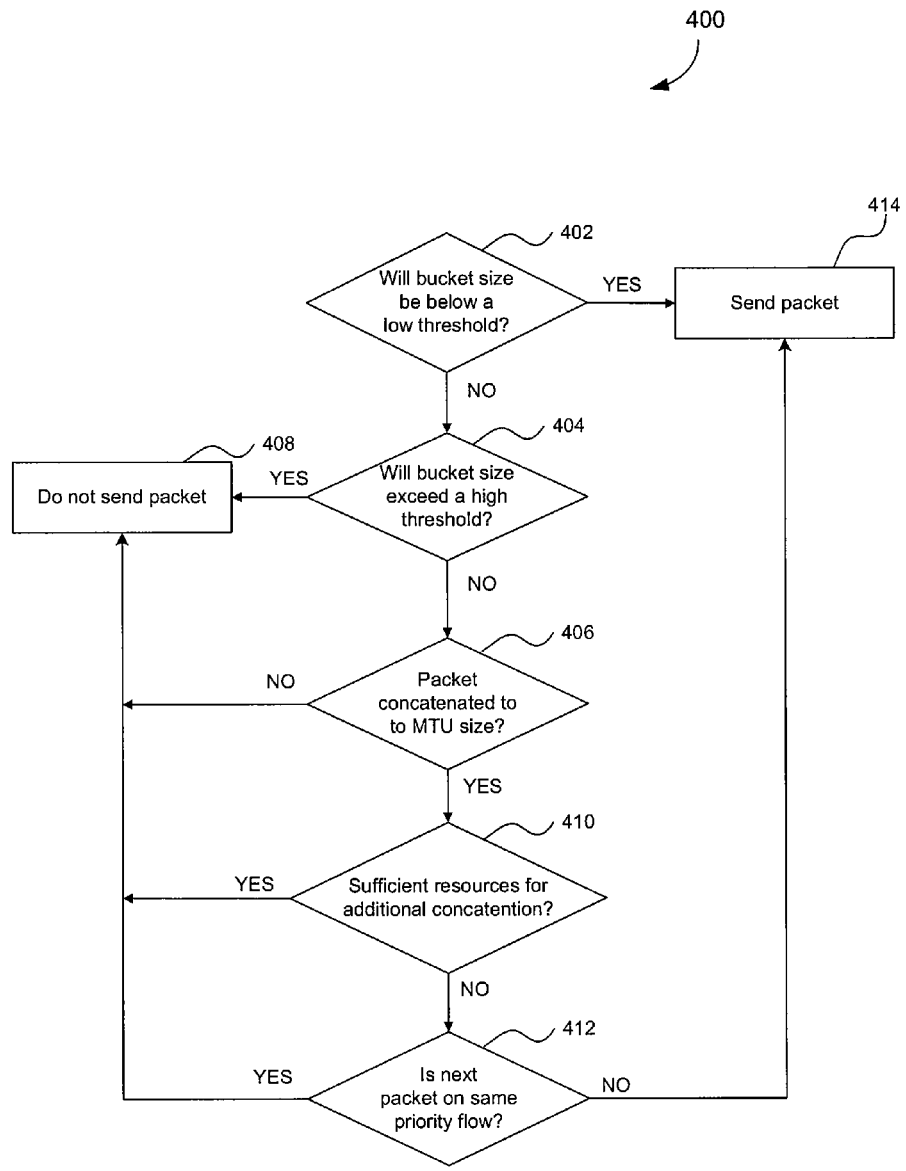
FIG. 4 illustrates a flowchart showing steps to determine whether a packet is to be transmitted in flow meter mode according to an embodiment of the invention.

FIG. 4 illustrates a flowchart 400 showing steps performed to determine whether a packet is to be transmitted in flow meter mode according to an embodiment of the invention. Flowchart 400 will be described with continued reference to the example operating environment depicted in FIG. 2. In an embodiment, the steps illustrated in FIG. 4 are performed by DEPI software running on processor 222. However, the flowchart 400 is not limited to that embodiment. Note that some steps shown in flowchart 400 do not necessarily have to occur in the order shown.

In step 402, it is determined whether the size of a current packet to be transmitted will result in the bucket size parameter being below the low threshold. For example, processor 222 determines whether the size of the current packet to be sent to output DMA controller 226 for transmission will result in the bucket size being below the low threshold for the particular channel as specified in table 4 above.

If it is determined that the bucket size will be below a low threshold based on the size of the current packet, then control proceeds to step 414. In step 402, if it is determined that the bucket size will be above the low threshold based on the size of the current packet to be transmitted, then control proceeds to step 404.

In step 404, it is determined whether the size of the current packet will result in the bucket size exceeding the high threshold. For example, processor 222 determines whether the size of the current packet to be sent to output DMA controller 226 for transmission will result in the bucket size being above the high threshold for the particular channel as specified in table 4 above If it is determined, that the bucket size will not exceed a high threshold then control proceed in step 406. In step 404, if it is determined that the bucket size will exceed a high threshold based on the size of the current packet to be transmitted, then control proceeds to step 408. In step 408, the packet is not transmitted. For example, processor 222 determines to not transmit the packet.

In step 406, it is determined whether the current packet has been concatenated with other packets up to a maximum transmission unit size. For example, processor 222 determines whether the current packet has been concatenated with other packets up to a maximum transmission unit size.

If it is determined in step 406, that the packet has not been concatenated to the maximum transmission unit size, then control proceeds to step 408.

If it is determined in step 406, that the packet has been concatenated with one or more other packets to the maximum transmission unit size, then control proceeds to step 410.

In step 410, it is determined whether sufficient packets are present for concatenation to the current packet up to the maximum transmission unit size. For example, processor 222 determines whether sufficient packets are present in the current descriptor ring being serviced for concatenation to the current packet up to the maximum transmission unit size.

In step 410, if it is determined that sufficient packets are present for concatenation to the current packet then control proceeds to step 408.

If it is determined in step 410 that sufficient packets are not present to concatenate to the current packet then control proceeds to step 412.

In step 412, it is determined whether a next packet to be processed is in the same descriptor ring as the current packet. For example, processor 222 determines whether a next packet to be processed is in the same descriptor ring as the current packet.

If it is determined in step 412, that a next packet to be processed is not in the same descriptor ring as the current packet then control proceeds to step 414.

If it is determined in step 412, that the next packet is in the same descriptor ring as the current packet to be transmitted then control proceeds to step 408.

MTU Mode

In MTU flow control mode, packets are sent solely based on their packet size. In this mode, packets are not transmitted until the total packet length reaches as close to the MTU as possible. MTU flow control mode is used when in MPT mode with idle packet identification (PID) insertion turned on. In this case, MPEG packets are delivered to the processor 222 at a channel rate.

It is to be appreciated by persons of ordinary skill in the art that the present invention, or portions thereof, can be implemented in hardware, firmware, software, and/or combinations thereof.

5. EXAMPLE GENERAL PURPOSE COMPUTER SYSTEM

Figure 5:
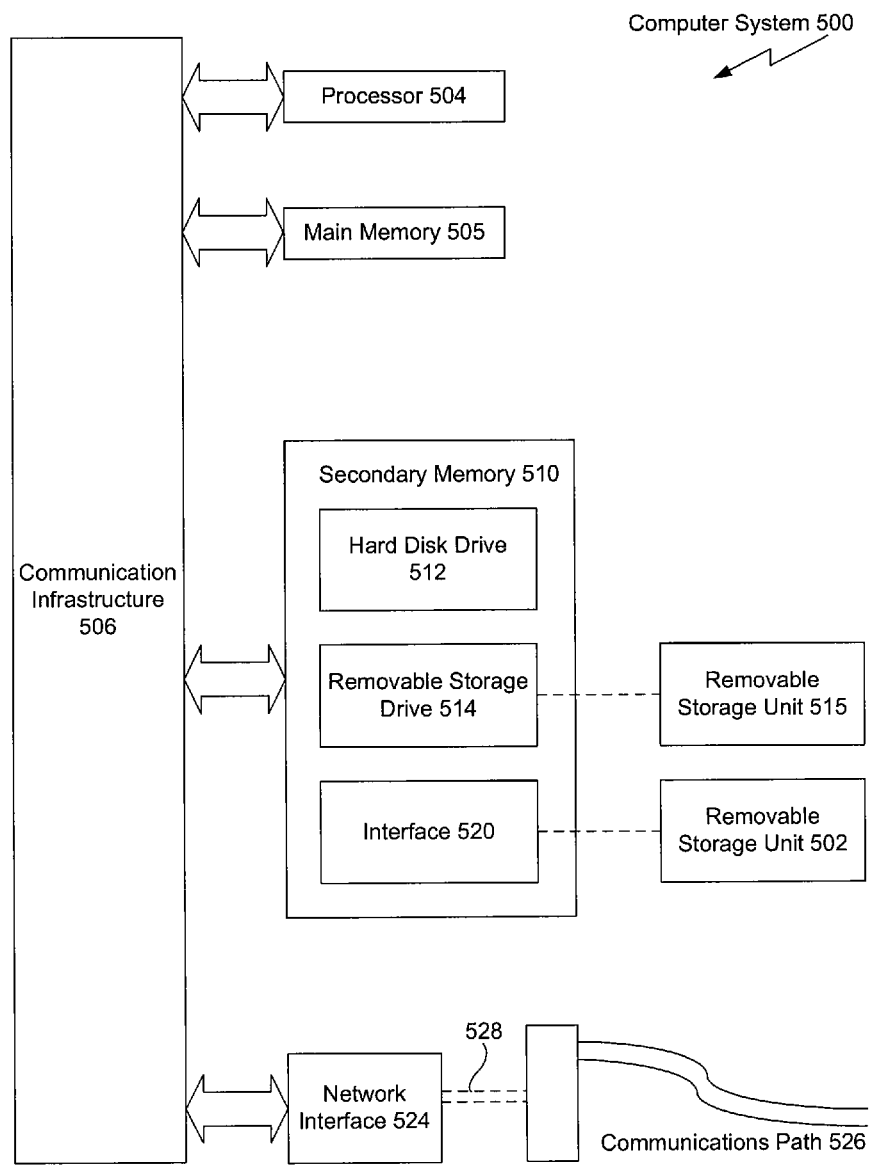
FIG. 5 is a block diagram of a computer system on which the present invention can be implemented.

The following description of a general purpose computer system is provided for completeness. The present invention can be implemented in hardware, or as a combination of software and hardware. Consequently, the invention may be implemented in the environment of a computer system or other processing system. An example of such a computer system 500 is shown in FIG. 5. The computer system 500 includes one or more processors, such as processor 504. Processor 504 can be a special purpose or a general purpose digital signal processor. The processor 504 is connected to a communication infrastructure 506 (for example, a bus or network). Various software implementations are described in terms of this exemplary computer system. After reading this description, it will become apparent to a person skilled in the relevant art how to implement the invention using other computer systems and/or computer architectures.

Computer system 500 also includes a main memory 505, preferably random access memory (RAM), and may also include a secondary memory 510. The secondary memory 510 may include, for example, a hard disk drive 512, and/or a RAID array 516, and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518, represents a floppy disk, magnetic tape, optical disk, etc. As will be appreciated, the removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a PCMCIA slot and card, etc. Software and data transferred via communications interface 524 are in the form of signals 528 which may be electronic, electromagnetic, optical or other signals capable of being received by communications interface 524. These signals 528 are provided to communications interface 524 via a communications path 526. Communications path 526 carries signals 528 and may be implemented using wire or cable, fiber optics, a phone line, a cellular phone link, an RF link and other communications channels.

The terms "computer program medium" and "computer usable medium" are used herein to generally refer to media such as removable storage drive 514, a hard disk installed in hard disk drive 512, and signals 528. These computer program products are means for providing software to computer system 500.

Computer programs (also called computer control logic) are stored in main memory 508 and/or secondary memory 510. Computer programs may also be received via communications interface 524. Such computer programs, when executed, enable the computer system 500 to implement the present invention as discussed herein. In particular, the computer programs, when executed, enable the processor 504 to implement the processes of the present invention. Where the invention is implemented using software, the software may be stored in a computer program product and loaded into computer system 500 using raid array 516, removable storage drive 514, hard drive 512 or communications interface 524.

In other embodiments, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

6. CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method to determine whether a packet is to be transmitted by a processor, comprising:
   determining whether a size of the packet results in a bucket size parameter being above a predetermined low threshold and below a predetermined high threshold;
   concatenating the packet with at least one other packet up to a maximum transmission unit size to generate a concatenated packet only if the size of the concatenated packet results in the bucket size parameter being above the predetermined low threshold and below the predetermined high threshold, otherwise sending the packet if the size of the packet results in the bucket size parameter being below the predetermined low threshold; and
   sending the concatenated packet when the packet has been concatenated with the at least one other packet up to the maximum transmission unit size,
   wherein the bucket size parameter is a parameter that is incremented with a number of bytes in the packet excluding a number of bytes in a header of the packet, and wherein the bucket size parameter is decremented at a rate at which packets are transmitted from an output channel.

2. The method of claim 1, wherein the maximum transmission unit size is programmable via a command from a source external to the processor.

3. The method of claim 1, wherein the packet is in a Packet Streaming Protocol (PSP) format or a Moving Picture Experts Group Transport Stream (MPT) format.

4. The method of claim 1, wherein the low threshold and high threshold values are programmable.

5. The method of claim 1, wherein the packet is stored in one of a high priority, medium priority, or low priority queue.

6. The method of claim 5, wherein each of the high priority, medium priority, and low priority queues has has an associated low threshold and high threshold.

7. The method of claim 1, further comprising: determining whether there are a sufficient number of other packets for concatenation with the packet up to the maximum transmission unit size.

8. The method of claim 1, further comprising: fragmenting the packet up to the maximum transmission unit size if the size of the packet is greater than the maximum transmission unit size.

9. The method of claim 8, wherein the packet is fragmented at a 32-bit boundary.

10. The method of claim 9, wherein each fragment of the packet has a payload of at least four bytes.

11. A method to control flow of packets, each packet having a custom header created by a processor, comprising:
    concatenating or fragmenting a packet descriptor associated with the packet based on one or more of associated packet size, maximum transmission unit, packet type, channel configuration information and flow control mode;
    creating a header for the packet based on data in a programmable header template and storing the header in a header buffer;
    determining whether to transmit the packet based on one of a flow meter flow control mode or a maximum transmission unit size flow control mode; and
    transmitting the packet by sending the packet descriptor to an output direct memory access (DMA) controller.

12. The method of claim 11, further comprising: prior to the concatenating or fragmenting step, determining whether there is a packet descriptor available in a DMA status First in First Out (FIFO) queue.

13. The method of claim 12, further comprising: placing the packet descriptor in one of a plurality of packet descriptor queues based on the priority level of the packet and de-queuing the packet descriptor from the DMA status FIFO queue.

14. The method of claim 13, further comprising: servicing the plurality of packet descriptor queues in a descending order of priority.

15. The method of claim 11, further comprising: determined whether at least two vacant entries are present on a descriptor ring storing the packet descriptor prior to fragmenting the packet descriptor.

16. The method of claim 11, wherein the maximum transmission unit is programmable.

17. The method of claim 11, further comprising: subsequent to the transmitting step, using the packet descriptor for a new incoming packet.

18. The method of claim 11, the determining step further comprising: using a bucket size parameter, low threshold and high threshold in flow meter flow control mode to determine whether a packet is to be transmitted.

19. The method of claim 11, the determining step further comprising: using the packet size and the maximum transmission unit size in the maximum transmission unit flow control mode to determine whether a packet is to be transmitted.

20. A method to determine whether a packet is to be transmitted by a processor, comprising:
    determining whether a size of the packet results in a bucket size parameter being above a predetermined low threshold and below a predetermined high threshold;
    concatenating the packet with at least one other packet up to a maximum transmission unit size to generate a concatenated packet only if the size of the concatenated packet results in the bucket size parameter being above the predetermined low threshold and below the predetermined high threshold, otherwise sending the packet if the size of the packet results in the bucket size parameter being below the predetermined low threshold; and
    sending the concatenated packet when the packet has been concatenated with the at least one other packet up to the maximum transmission unit size,
    wherein the bucket size parameter is a parameter that is incremented with a number of bytes in the packet excluding a number of bytes in a header of the packet, and wherein the bucket size parameter is decremented at a rate at which packets are transmitted from an output channel.

21. A method to determine whether a packet is to be transmitted by a processor, comprising:
    determining whether a size of the packet results in a bucket size parameter being above a predetermined low threshold and below a predetermined high threshold; and
    concatenating the packet with at least one other packet up to a maximum transmission unit size to generate a concatenated packet only if the size of the concatenated packet results in the bucket size parameter being above the predetermined low threshold and below the predetermined high threshold, otherwise sending the packet if the size of the packet results in the bucket size parameter being below the predetermined low threshold;

wherein the maximum transmission unit size is programmable via a command from a source external to the processor, and wherein the bucket size parameter is a parameter that is incremented with a number of bytes in the packet excluding a number of bytes in a header of the packet, and wherein the bucket size parameter is decremented at a rate at which packets are transmitted from an output channel.

22. A method to determine whether a packet is to be transmitted by a processor, comprising:

fragmenting the packet up to a maximum transmission unit size if a size of the packet is greater than the maximum transmission unit size;

determining whether the size of the packet results in a bucket size parameter being above a predetermined low threshold and below a predetermined high threshold; and concatenating the packet with at least one other packet up to the maximum transmission unit size to generate a concatenated packet only if the size of the concatenated packet results in the bucket size parameter being above the predetermined low threshold and below the predetermined high threshold, otherwise sending the packet if the size of the packet results in the bucket size parameter being below the predetermined low threshold;

wherein the bucket size parameter is a parameter that is incremented with a number of bytes in the packet excluding a number of bytes in a header of the packet, and wherein the bucket size parameter is decremented at a rate at which packets are transmitted from an output channel.

* * * * *

UNITED STATES PATENT AND TRADEMARK OFFICE
CERTIFICATE OF CORRECTION

PATENT NO. : 8,831,024 B2
APPLICATION NO. : 11/966843
DATED : September 9, 2014
INVENTOR(S) : Robinson et al.

Page 1 of 1

It is certified that error appears in the above-identified patent and that said Letters Patent is hereby corrected as shown below:

In the Claims

In column 25, line 44, Claim 6, replace "has has an" with -- has an --.

Signed and Sealed this
Third Day of February, 2015

Michelle K. Lee
*Deputy Director of the United States Patent and Trademark Office*